UNITED STATES PATENT OFFICE.

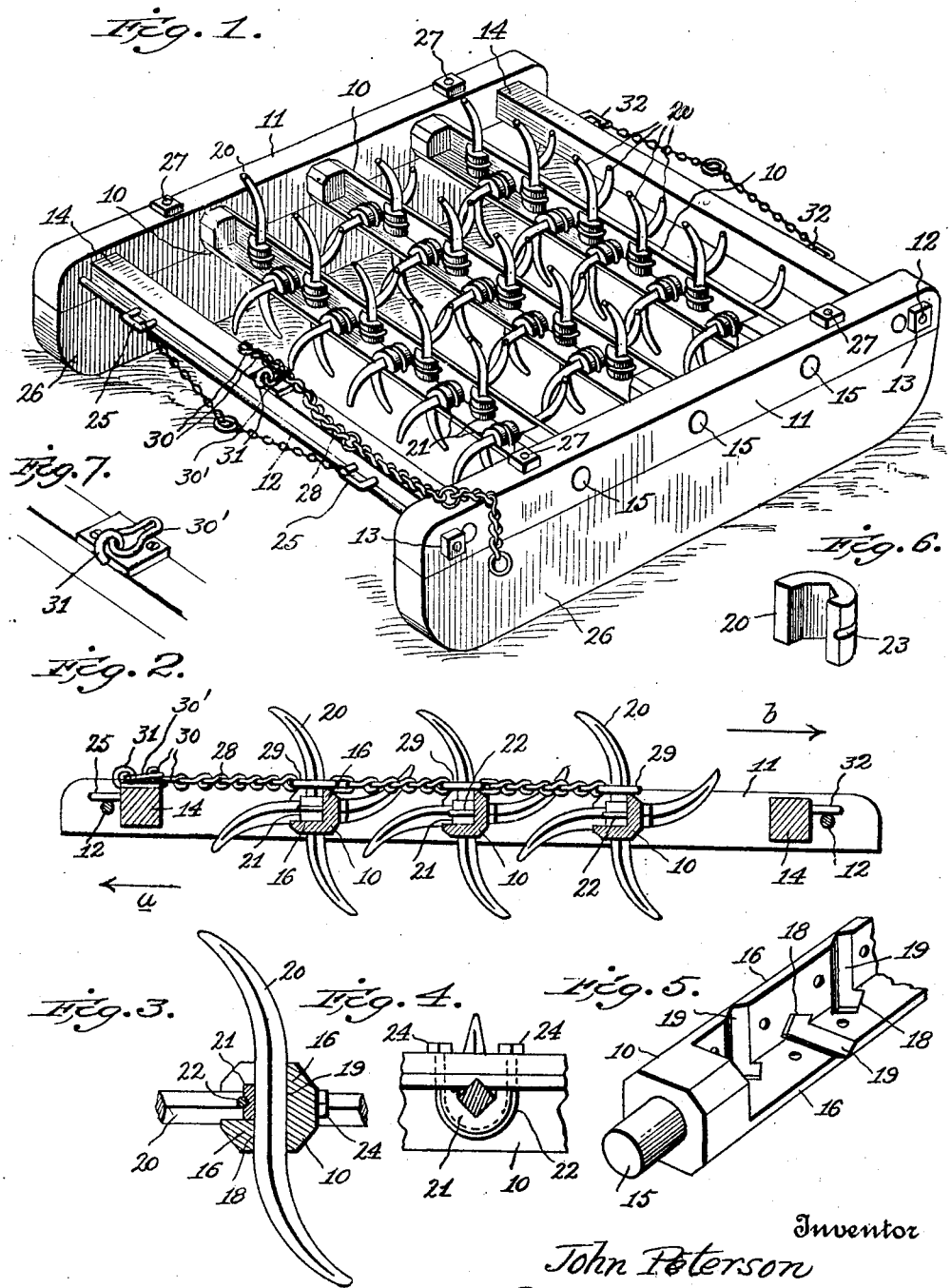

JOHN PETERSON, OF ONTONAGON, MICHIGAN.

HARROW.

1,324,407.  Specification of Letters Patent.  Patented Dec. 9, 1919.

Application filed May 31, 1919. Serial No. 301,063.

*To all whom it may concern:*

Be it known that I, JOHN PETERSON, citizen of the United States, residing at Ontonagon, in the county of Ontonagon and State of Michigan, have invented certain new and useful Improvements in Harrows, of which the following is a specification.

This invention relates to improvements in harrows and has for one of its objects to provide an implement of this character whose parts can be easily separated and reassembled when desired, thereby forming a practical knock-down harrow.

A further object is to provide a harrow of the rotary type with a locking means whereby the harrow teeth can be held in a fixed position to form a harrow of the non-rotatable type, and a still further object is to provide a particular design of tooth bars which will retain the teeth rigidly in position and at the same time allow of their removal for repairing or substitution of new teeth.

These and other objects hereinafter set forth are attained by the means illustrated in the accompanying drawings, in which:—

Figure 1 is a perspective view of the improved harrow and shown mounted on removable runners upon which the harrow is transported from one place to another.

Fig. 2 is a longitudinal vertical section through the harrow showing the locking chain in engagement with the teeth to prevent the tooth-wheels from rotating.

Fig. 3, is a detail section through one of the tooth-bars.

Fig. 4 is a detail plan view of a portion of one of the tooth-bars showing one of the tooth securing means.

Fig. 5 is a detail perspective view of one end of one of the tooth-bars. Fig. 6 is a detail perspective view of one of the bearing blocks used for holding the teeth, and Fig. 7 is a view of the grab-link with its hook.

Similar reference numerals in all of the figures of the drawing designate like parts.

Referring to the drawing, 10 designates the tooth-bars having their ends mounted to rotate in the side-rails or operating runners 11, and said side-rails being secured together at their ends by the tie-rods 12 which are held in position by the removable nuts 13. In addition to the tie-rods at each end of the runners 11 is provided the spacing cross-bars 14 which prevent the tie-rods from drawing the runners 11 so close together as to bind on the ends of the tooth-bars 10 and prevent them from rotating.

Preferably three of the tooth-bars are used and each has secured therein a series of harrow-teeth preferably arranged at right-angles to each other and with the teeth of the middle tooth-bar positioned in staggered relation to the teeth in the other bars. Each of the tooth-bars is provided with a trunnion 15 at each end, said trunnions having bearings in openings formed in the side-rails and adapted to rotate therein. The tooth-bars are also channeled intermediate their ends to form the relatively thin walls 16 arranged at an angle to each other, and tooth apertures 18 are formed through these walls 16 and are alternately arranged first through one wall and then in the other wall, so that when the teeth are positioned in the bars they will be arranged at right-angles to each other. The inner faces of the walls 16 are formed with V-shaped recesses 19 each of which registers with one of the tooth apertures in the other wall, so when a tooth is positioned in one of the apertures, a portion of its stem will engage in one of the recesses which forms a seat therefor. The teeth 20 are preferably formed angular in cross-section to prevent rotating in their seats, and the sides of the teeth not engaged in the recesses 19, are supported in bearing blocks 21 which are also notched to conform to the shape of the side of the tooth, and are secured in position by yoke-clips 22 which engage in a suitable groove 23 formed around the blocks and whose free ends extend through its respective wall 16 and are provided with suitable tightening nuts 24. The teeth besides being angular in cross-section have their ends curved in opposite directions from their intermediate portions or stems which are supported in the tooth-bars, these curved ends forming better rake teeth than the usual straight harrow teeth. The channeled tooth-bars with the relatively thin supporting side-walls, facilitate the insertion and removal of the double-end teeth which are curved to secure better results in penetrating the soil and raking the ground. Thus the teeth can be formed and curved to the desired shape before their attachment to the bars, which advantage could not be secured if the tooth-bars were formed without the channels, as it would be impossible to thread the curved ends of the long double teeth through straight apertures in a solid tooth-bar.

With the construction thus far described, and with a suitable draft means attached to the loops 25 on the front end of the harrow, and the harrow be then drawn in the direction of the arrow a, Fig. 2, the teeth will engage deep into the soil one after another as the tooth-bars are rotated, and as the lumps and clods are lifted by the teeth as they pass out of the soil, the adjacent teeth on the next bar will pass downwardly between the first mentioned teeth and crush the clods or lumps between the oppositely moving teeth.

To move the harrow from one place to another without the teeth engaging the ground, a pair of transporting runners 26 are provided and which are detachably secured to the underside of the side-rails 11 by the bolts 27, these transporting runners being sufficiently high to lift the teeth free from the surface of the ground.

To convert the rotary harrow to a drag harrow wherein the teeth are immovable with respect to the side-bars, a locking chain is provided to engage a tooth in each respective bar to prevent its rotation. In its preferred form this locking means comprises a chain 28 having equally spaced tooth engaging rings inserted in its length, said rings being designated by the reference numerals 29, and attaching links 30 at one end adapted to engage a grab-link 30' fixed to a hook 31 rigidly secured to the front spacing bar 14. Thus to lock the rotatable tooth-wheels in one position, the rings 29 are inserted over one tooth in each bar and one of the attaching links is then secured to the link 30', as clearly shown in Fig. 2 of the drawing. When the harrow is used in this manner, the draft means is attached to the loops 32, and the harrow is drawn in the direction of the arrow b, thus presenting the ends of the curved teeth to the soil first. Several attaching links 30 are provided to form different lengths of chain, whereby the teeth-wheels can be secured in different positions to present more than one tooth in each wheel to the ground if desired to secure finer results. This also will regulate the depth of penetration of the teeth.

While constructed and intended primarily to be used in combating quack-grass, the harrow can be used wherever the ordinary drag harrow is required.

It will be understood that when the device is being used as a rotary harrow, the tooth-wheel holding chain can be entirely detached if desired.

Having thus fully described the invention, what is claimed is:—

1. A harrow comprising a pair of operating runners, spacing-bars extending between said runners, tie-rods for securing said runners and spacing-bars together to form a rigid frame, a series of channeled tooth-bars forming two angularly arranged relatively thin walls, and having ends mounted to rotate in said runners, and a series of teeth mounted to pass through one of said thin walls and resting upon the other, each of said teeth having an angular central body-portion secured to the tooth-bar and ends projecting on each side of the tooth-bar and curved in opposite directions from the body-portion.

2. In a harrow, a frame, a series of tooth-bars rotatably mounted in the frame, each tooth-bar being channeled to form two relatively thin and angularly arranged side-walls, a series of tooth-apertures formed through the side-walls, and a series of teeth secured intermediate their ends in said tooth apertures of one of said thin walls and resting upon the other, said teeth having ends curved in opposite directions from their body-portions.

3. In a harrow, a frame, a series of tooth-bars rotatably mounted in the frame, each tooth-bar being channeled to form two relatively thin and angularly arranged side-walls, said side-walls being provided with a series of tooth apertures alternately arranged in opposite walls and also a series of recesses registering with the apertures in the opposite wall, a series of teeth supported in said apertures of one of said thin walls and resting in said recesses of the other thin wall, and means in the channels of the tooth-bars for clamping and securing the teeth in position.

4. In a harrow having a series of tooth-wheels which are rotated when the harrow is drawn in one direction, an adjustable locking means secured to the frame of the harrow and constructed to engage the teeth of the several wheels to hold the wheels in different adjusted positions at different times and prevent them from rotating when the harrow is drawn in the opposite direction.

In testimony whereof I affix my signature.

JOHN PETERSON.